(12) United States Patent
Fakes et al.

(10) Patent No.: US 7,661,123 B2
(45) Date of Patent: Feb. 9, 2010

(54) SECURITY POLICY UPDATE SUPPORTING AT LEAST ONE SECURITY SERVICE PROVIDER

(75) Inventors: Thomas F. Fakes, Redmond, WA (US); Anders M. E. Samuelsson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 670 days.

(21) Appl. No.: 10/729,530

(22) Filed: Dec. 5, 2003

(65) Prior Publication Data

US 2005/0125694 A1 Jun. 9, 2005

(51) Int. Cl.
*H04L 29/00* (2006.01)
(52) U.S. Cl. .......................................................... 726/1
(58) Field of Classification Search ........................ None
See application file for complete search history.

(56) References Cited

U.S. PATENT DOCUMENTS

| | | | |
|---|---|---|---|
| 4,104,721 A | 8/1978 | Markstein et al. | |
| 4,970,504 A | 11/1990 | Chen | |
| 6,006,328 A | 12/1999 | Drake | |
| 6,119,236 A | 9/2000 | Shipley | |
| 6,158,010 A * | 12/2000 | Moriconi et al. | 726/1 |
| 6,173,404 B1 | 1/2001 | Colbum et al. | |
| 6,178,173 B1 | 1/2001 | Mundwiler et al. | |
| 6,301,668 B1 | 10/2001 | Gleichauf et al. | |
| 6,408,391 B1 | 6/2002 | Huff et al. | |
| 6,513,721 B1 | 2/2003 | Salmre et al. | |
| 6,530,024 B1 | 3/2003 | Proctor | |
| 6,606,710 B2 | 8/2003 | Krishnan et al. | |
| 6,684,244 B1 * | 1/2004 | Goldman et al. | 709/223 |
| 6,789,202 B1 | 9/2004 | Ko et al. | |
| 6,910,135 B1 | 6/2005 | Grainger | |
| 7,000,247 B2 * | 2/2006 | Banzhof | 726/2 |
| 7,010,807 B1 | 3/2006 | Yanovsky | |
| 7,093,292 B1 | 8/2006 | Pantuso | |
| 7,203,962 B1 | 4/2007 | Moran | |

(Continued)

FOREIGN PATENT DOCUMENTS

JP 2003140890(A) 5/2003

(Continued)

OTHER PUBLICATIONS

Date, "An Introduction to Database System", 2001, Addison-Wesley, 7th Edition, pp. 462-464.*

(Continued)

*Primary Examiner*—Minh Dinh
(74) *Attorney, Agent, or Firm*—Lee & Hayes, PLLC (57) ABSTRACT

Security policy update supporting at least one security service provider includes each of one or more security service providers receiving a set of new rules to be enforced as part of a new security policy. Each security service provider processes the new rules in order to be ready to begin using the new rules, but continues to use the previous set of rules until instructed to begin using the new rules. When all of the one or more security service providers are ready to begin using the new rules, they are instructed to begin using the new rules at which point all of the security service providers begin using the set of new rules substantially concurrently.

28 Claims, 4 Drawing Sheets

U.S. PATENT DOCUMENTS

| | | | |
|---|---|---|---|
| 2002/0112183 A1 | 8/2002 | Baird, III et al. | |
| 2003/0051154 A1 | 3/2003 | Barton et al. | |
| 2003/0065942 A1 | 4/2003 | Lineman et al. | |
| 2003/0204632 A1 | 10/2003 | Willebeek-LeMair et al. | |
| 2003/0236994 A1 | 12/2003 | Cedar et al. | |
| 2004/0003266 A1* | 1/2004 | Moshir et al. | 713/191 |
| 2004/0015719 A1 | 1/2004 | Lee et al. | |
| 2004/0064731 A1 | 4/2004 | Nguyen et al. | |
| 2004/0139004 A1 | 7/2004 | Cohen et al. | |
| 2004/0260945 A1 | 12/2004 | Raikar et al. | |
| 2005/0044418 A1* | 2/2005 | Miliefsky | 713/201 |
| 2005/0125694 A1 | 6/2005 | Fakes et al. | |
| 2005/0262362 A1* | 11/2005 | Patrick et al. | 713/193 |
| 2006/0021002 A1 | 1/2006 | Townsend et al. | |

FOREIGN PATENT DOCUMENTS

| | | |
|---|---|---|
| RU | 2077113(C1) | 4/1997 |
| RU | 2148856(C1) | 5/2000 |

OTHER PUBLICATIONS

Dubie, "LANDesk punches up patch management suite", Network World, Jul. 2003, Retrieved from the Internet on Sep. 22, 2007: <URL: http://www.networkworld.com/news/2003/0707patch.html>.*

Ulfelder, "Practical patch management", Network World, Oct. 2002, Retrieved from the Internet on Sep. 22, 2007: <URL: http://www.networkworld.com/supp/security2/patch.html>.*

"Database Two Phase Commit—Software Technology Review", Software Engineering Institute, 2001, Retrieved from the Internet on Sep. 30, 2007: <URL: http://web.archive.org/web/20020211053052/http://www.sei.cmu.edu/str/descriptions/dtpc.html>.*

Balasubramaniyan, et al., "An Architecture for Intrusion Detection using Autonomous Agents", 14th IEEE computer Security Applications Conference, Dec. 1998, pp. 12.

Caldwell, "The Importance of Event Correlation for Effective Security Management," Information Systems Control Journal, vol. 6, 2002, pp. 36-38.

Doh, et al., "Fast Forward and Fast Rewind Play System Based on the MPEG System Stream with New Concept," 1999 IEEE, pp. 846-850.

Krugel et al.,"Decentralized Event Correlation for Intrusion Detection," ICICS 2001, vol. 2288, Dec. 6-7, 2001, pp. 114-131.

Tan, et al., "Video Transcoding for Fast Forward/Reverse Video Playback," IEEE ICIP, 2002, pp. I-714 through I-716

Wee, et al., "Compressed-Domain Reverse Play of MPEG Video Streams," Part of the SPIE Conference on Multimedia Systems and Applications, Boston, Mass, Nov. 1998, SPIE vol. 3528, pp. 237-248.

Montesi, et al; "Analysis and optimization of active databases"; Data & Knowledge Engineering, vol. 40, No. 3; pp. 241-271; Mar. 2002; Netherlands.

Montesi, et al; "A Transaction Transformation Approach to Active Rule Processing"; IEEE Comput. Soc. Press, Los Alamitos, CA, USA; 1995; pp. 109-116.; Proceedings of the Eleventh International Conference on Data Engineering.

Park, et al; "Mini-Savepoints: Firewall for Atomic Updates"; Database Systems for Advanced Applications '97; Proceedings of the Fifth International Conference; pp. 293-302; Apr. 1-4, 1997.

* cited by examiner

SECURITY POLICY UPDATE SUPPORTING AT LEAST ONE SECURITY SERVICE PROVIDER

TECHNICAL FIELD

This invention relates to security, and more particularly to security policy update supporting at least one security service provider.

BACKGROUND

Computers have become increasingly commonplace and increasingly interconnected, such as by the Internet and the use of electronic mail (email). Unfortunately, such increased interconnectivity has resulted in increased attacks against computers by malicious users. During such attacks, malicious users oftentimes try to introduce malicious programs on to other users' computers (e.g., designed to disable the other users' computers, obtain information from the other users' computers, launch attacks against still other computers, and so forth), attempt to disable a computer so that its performance is greatly impaired (e.g., by bombarding the computer with requests), and so forth. From the perspective of the user of the attacked computer, these attacks can range from being annoying to devastating, potentially resulting in the computer being inoperable or confidential information being copied from the computer.

In order to combat these attacks, security services that run on a computer have been created to protect that computer from attack. Examples of such security services include antivirus programs and firewall programs. One aspect of these security services is that they typically need to be updated regularly in order to be able to protect against the latest attacks.

However, one problem that can exist when updating security services is that the capabilities of the services may be hindered during the updating process. As such, the computer can face an increased vulnerability to attack when being updated. Thus, it would be beneficial to have a way to reduce the vulnerability of computers during the updating of the security services on the computer.

SUMMARY

Security policy update supporting at least one security service provider is described herein.

In accordance with certain aspects, each of one or more security service providers receives a set of new rules to be enforced as part of a new security policy. Each security service provider processes the new rules in order to be ready to begin using the new rules, but continues to use the previous set of rules until instructed to begin using the new rules. When all of the one or more security service providers are ready to begin using the new rules, they are instructed to begin using the new rules at which point all of the security service providers begin using the set of new rules substantially concurrently.

BRIEF DESCRIPTION OF THE DRAWINGS

The same numbers are used throughout the document to reference like components and/or features.

DETAILED DESCRIPTION

Updating a security policy in one or more security service providers is described herein. Multiple security service providers can be employed in a device to provide security, such as antivirus protection, intrusion detection, intrusion prevention, and so forth. A security policy can be used to describe the rules that are to be applied by these providers. When changes are made to security policy, updated rules are supplied to the various security service providers, and these various security service providers change over to start using the updated rules at substantially the same time.

Figure 1:
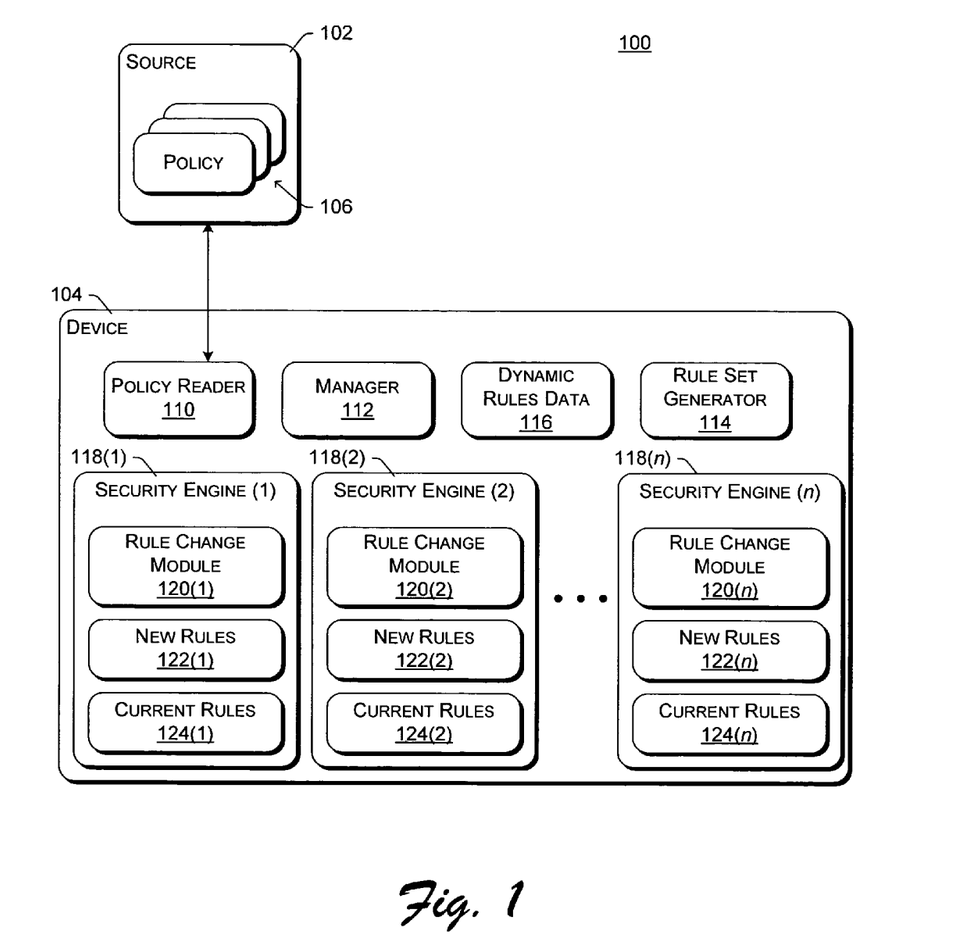
FIG. 1 illustrates an example environment in which the security policy update can be used.

FIG. 1 illustrates an example environment 100 in which the security policy update can be used. Environment 100 includes a source device 102 and a device 104. Source device 102 stores or otherwise has access to or can obtain one or more security policies 106. A security policy 106 describes how various security service providers on device 104 should operate. Although only one source device 102 is illustrated in FIG. 1, it is to be appreciated that a device 104 can obtain security policies (or different portions of security policies) from multiple different source devices 102. Similarly, although only one device 104 is illustrated in FIG. 1, it is to be appreciated that multiple devices 104 can obtain security policies from the same source device 102.

Device 104 can be any of a variety of devices where a security policy may be enforced, and source device 102 can be any of a variety of devices that make a security policy (or portion of a security policy) available. Examples of devices 104 and source devices 102 include desktop or workstation computing devices, server computing devices, portable or handheld computing devices, game consoles, network appliances, cellular phones, personal digital assistants (PDAs), networking devices (e.g., routers, gateways, firewalls, wireless access points, etc.), and so forth.

Environment 100 can represent any of a variety of settings, such as networks in home, business, educational, research, etc. settings. For example, source device 102 may be a server device on a corporate LAN, and device 104 may be a desktop or portable computing device on the corporate LAN. By way of another example, source device 102 may be a server device on the Internet, and device 104 may be a desktop computing device at a user's home.

Device 104 includes a policy reader module 110, a manager module 112, a rule set generator module 114, dynamic rules data store 116, and one or more security service providers (also referred to as security engines) 118. It is to be appreciated that although separate modules are shown in device 104 of FIG. 1, alternatively one or more of these modules may be combined into a single module, and/or one or more of these modules may be separated into two or modules.

Generally, to update the security policy being enforced by security engines 118 on device 104, policy reader 110 obtains a security policy 106 from source device 102. Rule set generator 114 uses the newly obtained security policy 106 to generate, for each of the various security engines 118, a set of one or more rules and associated data. These sets of rules are then communicated to the various security engines 118, and the associated data is stored in dynamic rules data store 116. The associated data can also be communicated to the security engines 118. Upon receiving the set of one or more rules, each security engine 118 processes the new set of rules, getting ready to begin using the new set of rules. However, each security engine 118 continues to use its current set of rules until instructed by manager 112 to change to the new set. Manager 112 instructs all of the security engines 118 to change to the new set of rules after manager 112 receives an indication from each of the security engines 118 that it is ready to change to the new set of rules.

Each security engine performs various actions to help secure device 104 from malicious users and/or malicious programs. Such malicious users and/or malicious programs may attempt to disable device 104 or disable functionality (e.g., programs) of device 104, obtain data from device 104 (e.g., passwords or other confidential information), use device 104 (e.g., to assist in attacking other devices), and so forth. A security engine 118 can be any service that assists in protecting against such malicious users and/or malicious programs.

Examples of security engines 118 include, but are not limited to: an antivirus engine, a firewall engine, an intrusion detection engine, a vulnerability analysis engine, and a behavioral blocking engine. An antivirus engine includes functionality to protect device 104 from being infected by viruses, worms, Trojan horses, and so forth. A firewall engine includes functionality to protect device 104 from being accessed over a network connection by other undesired devices (e.g., any device that a user or administrator of device 104 does not want accessing device 104), and also functionality to block malicious code from propagating to other devices over the network. An intrusion detection engine includes functionality to identify when a malicious program and/or user has accessed device 104 (e.g., due to the antivirus and/or firewall engines having been overridden or having failed, etc.) and take appropriate action (e.g., notify a user or administrator, attempt to disable the malicious program or halt the malicious user's access, etc.). A vulnerability analysis engine includes functionality to attempt to detect vulnerabilities in device 104 (e.g., due to security engines that have not been installed or updated correctly, security engines or other components being configured incorrectly, and so forth). A behavior blocking engine includes functionality to monitor programs running on device 104 and detect improper behavior (e.g., improper network or storage device access) by those programs.

In certain embodiments, manager module 112 coordinates the updating of security policy in device 104. Manager 112 receives the indications from the various security engines 118 that indicate the security engines 118 are ready to change to the new set of rules, and gives an indication to the security engines 118 when they should begin using the new set of rules.

Policy reader module 110 obtains a new security policy from source device 102. Policy reader module 110 may be configured to check whether a new security policy is available from source 102 at regular or irregular intervals, or alternatively may receive an indication from some other component (e.g., manager 112, source device 102, some other device not shown in FIG. 1, and so forth) that it should obtain a new security policy from source 102 (or check whether a new security policy is available from source 102). Policy reader 110 may identify to source 102 a particular security policy that reader 110 desires to obtain, or alternatively may merely request the most recent security policy for device 104 from source 102. A comparison between the current security policy being used by device 104 and the most recent security policy may be made to determine whether the most recent security policy is already being enforced on device 104. Such a comparison could be made by source 102, policy reader 110, or alternatively some other component.

When the new security policy is obtained from source 102, rule set generator 114 generates a set of rules for each of the different security engines 118. Different security engines may use different rules when enforcing the security policy on device 104. For example, one security engine 118 may be a firewall whereas another security engine 118 may be an antivirus component. The security policy may identify rules that are specific to the antivirus engine (and thus the firewall engine need not be concerned with them), and may also identify rules that are specific to the firewall engine (and thus the antivirus engine need not be concerned with them).

In certain embodiments, the security policy itself is a list of rules and associated data. The security policy may also include an indication of which rules and data are for which security engines, or alternatively no such indication may be included (e.g., relying on device 104 to determine which rules are for which security engines). The security policy allows designers to have a single record or file of all the rules involved in the protection of device 104, without having to separate the rules across different records or files for the different security engines.

Additionally, using the techniques described herein, new security policies can be prepared by designers that shift responsibility for protecting against particular attacks from one security engine to another. For example, protection against a particular type of attack may be enforced by an antivirus program in one security policy but changed to being enforced by a firewall program in a new security policy. Using the techniques described herein, the designers can be confident that this shift in responsibility will occur in all of the security engines substantially concurrently, thereby reducing the vulnerability of the device 104 to attacks during the shift.

Rule set generator 114 identifies, based on the security policy, which rules and associated data (if any) are used by which of the security engines 118. For each security engine 118, rule set generator 114 generates a set of rules for that security engine and makes that generated set of rules available to that security engine (e.g., the set of rules may be transmitted or sent to the security engine, the security engine may be informed of a location in memory where the generated set of rules can be obtained, etc.). This generation can be performed in a variety of different manners. For example, a new set of rules may be generated by generator 114 without regard for the current rules being enforced by the security engines 118. By way of another example, the current set of rules may be modified or changed to incorporate any differences between the current and new set of rules. Additionally, rule set generator 114 may simply copy the rules from the security policy, or alternatively rule set generator 114 may generate the rules based on information in the security policy that describes the rules.

In certain embodiments, the security policy identifies which rules are to be distributed to which security engines. For example, each rule may be associated with a particular label or identifier (e.g., Security Engine (1), or Antivirus engine, etc.). Rule set generator 114 can thus use these identifiers in generating the sets of rules for the various security engines 118. In alternate embodiments, rule set generator 114 may infer which rules are to be distributed to which security engines. In other embodiments, a combination of these techniques may be used (e.g., for some rules the security policy may identify which security engine they are to be assigned to, and for other rules the security policy generator 114 may infer which security engine they are to be assigned to).

The set of rules generated by rule set generator 114 can take any of a variety of different forms. In certain embodiments, the rules follow an if-then structure. Using this structure, the rule defines a particular condition(s) and a corresponding particular action(s) or result(s). During enforcement of the rule, if that particular condition(s) is detected then the corresponding particular action(s) or result(s) is performed. Any of a variety of conditions and corresponding results can be identified by a rule. Examples of particular conditions include: attempts to access particular resources (e.g., memory locations, network addresses or ports, other programs, files on a storage device, and so forth), attempts to write data to particular locations (e.g., to particular memory locations, to particular locations on a storage device, etc.), attempts to run particular programs, various aspects of the current operating state of the device 104 (e.g., resources available, programs running, etc.), and so forth. Examples of particular results include: preventing a resource from being accessed, preventing data from being written to particular locations, preventing a program from being run, generating a notification that the occurrence of the condition in the rule was detected (e.g., recording its occurrence in a log, sending a message to a user or other computer, and so forth). The particular results can also be permissive in nature rather than preventive. For example, the results could indicate that a particular resource or location can be accessed only if the condition in the rule is satisfied by the device 104, or that a particular program can be run only if the condition in the rule is satisfied by the device 104.

In certain embodiments, device 104 includes dynamic rules data store 116 which is the data associated with the various rules being enforced by security engines 118. In certain embodiments, dynamic rules data store 116 may include two sets of data: one set for the current rules being enforced by security engines 118, and another set for the new rules that security engines 118 are being updated to enforce. When a new security policy is received, generator 114 updates dynamic rules data store 116 with the data associated with the sets of new rules passed to security engines 118.

Each security engine 118 includes a rule change module 120 that receives a set of one or more rules from rule set generator 114. The data associated with the rules may be received from generator 114 along with the rules, or alternatively rule change module 120 may obtain the data it desires from dynamic rules data 116. Additionally, it should be noted that although rule set generator 114 is discussed above as generating a set of rules for each security engine 118 based on the security policy, alternatively each security engine 118 may receive the entire security policy (or most of the security policy) and generate their own set of rules rather than receiving the set from generator 114.

Rule change module 120 processes the new set of rules as needed in order to generate new internal rules 122 that enforce the new policy. The processing of the new set of rules to generate new internal rules 122 refers to whatever actions are necessary for the security engine to take in order to place the new set of rules in a state that they can be enforced by the security device. For example, this processing may include converting the new set of rules to an internal format, storing rules in particular memory locations, organizing rules into a particular arrangement or order, etc. Rule change module 120 may generate new rules in any of a variety of manners; module 120 may keep the rules in the same format as they were received from generator 114 or alternatively convert the rules to an internal format use by the security engine.

Regardless of how the new rules are generated, each security engine 118 maintains a current set of rules 124 which enforce the previous security policy for device 104 (the security policy which is being updated). While generating the new rules 122, and even after the new rules 122 are generated, the security engine continues to enforce current rules 124. Security engine 118 does not begin enforcing new rules 122 until instructed to do so (e.g., by manager 112).

After rule change module 120 has finished generating new rules 122, module 120 indicates to manager 112 that it has finished and is ready to switch to using the new rules (and thus begin enforcing the new security policy). After manager 112 has received such an indication from all of the security engines 118, manager 112 instructs each of the security engines 118 to begin using the new rules. Manager 112 waits to instruct each of the security engines to begin using the new rules until after manager 112 receives the indication from all of the security engines 118. Once instructed to do so, each security engine 118 begins using the new rules 122. As soon as a security engine 118 begins using the new rules 122, it can delete the rules it was previously using (current rules 124).

In some situations, a security engine 118 may fail in processing the new rules. In such situations, the security engine 118 returns an indication of such failure to manager 112. Alternatively, manager 112 may impose a time limit on responses from the security engines 118. If all security engines 118 have not responded with an indication that they are ready to begin using the new rules within the time limit, then manager 112 can assume that one or more of the security engines 118 has failed in processing the new rules.

When manager 112 identifies that one or more of the security engines 118 has failed in processing the new rules, manager 112 does not instruct any of the security engines 118 to begin using the new rules. Rather, manager 112 sends an indication to abort the changeover to the new rules (this may also be referred to as a rollback). Such an abort or rollback indication informs each of the security engines 118 that it is to ignore the new rules received from generator 114 as well as any new rules 122 resulting from its processing, and continue to use the current rules. In certain embodiments, the security engines 118 can safely delete the new rules they generated (or are in the process of generating) in response to such an abort or rollback indication.

In certain embodiments, each security engine 118 waits until it can nearly ensure that it can begin using the new rules before informing manager 112 that it is ready to begin using the new rules. In other words, the security engine 118 waits to inform manager 112 that it is ready to begin using the new rules until the security engine 118 is to the point in processing the new rules that it is virtually impossible for the security engine 118 to fail to begin enforcing those rules when instructed to do so. In certain embodiments, this is accomplished by security engine 118 generating the new set of rules 122, and maintaining a pointer to which of the rule sets (set 122 or set 124) it is to use. After the new set of rules 122 is generated, security engine 118 indicates to manager 112 that the security engine is ready to begin using the new set of rules. Then, when instructed to begin using the new set of rules, the security engine can simply change its pointer from the old set of rules to the new set of rules. The security engine 118 can nearly ensure that it can change its pointer and begin using the new rules. It is to be appreciated that "nearly ensure" does not require a 100% guarantee that failure is absolutely impossible. It is possible that certain situations could still arise that would result in failure (e.g., a power loss or virus attack that prohibits changing of the pointer). However, it is also to be appreciated that the chances of failure are very small.

Manager 112 can instruct the security engines 118 to begin using the new set of rules (also referred to as switching over to the new set of rules) in any of a variety of different manners. The manner that is used, however, should operate to inform all of the security engines at substantially the same time so that all of the security engines can begin using their new sets of rules at substantially the same time (also referred to herein as substantially concurrently). By having all of the security engines begin using their new sets of rules at substantially the same time, any vulnerability of device 104 due to the rule changeover is reduced. Generally, the closer in time that the security engines begin using their new sets of rules, the lesser the vulnerability of the device during the changeover to the new set of rules. Following are some examples of ways in which manager 112 can instruct the security engines 118 at substantially the same time to begin using their new sets of rules.

One way in which manager 112 can instruct the security engines 118 to begin using the new set of rules is to use an event object that can be fired across all of the security engines at once. For example, each security engine, upon receipt of the new rules from rule set generator 114, sets an internal flag to start polling a particular event each time the rules are accessed (during its normal operation of protecting device 104). Manager 112 can then instruct the security engines to begin using their new sets of rules by firing the event (the same one being polled by the security engines). So, after the event is fired, any subsequent polling of the event will reflect that the event has been fired and thereby inform the polling security engine that the new rule set should be used. For example, in response to detecting the event having been fired, the pointer in the security engine can be changed to point to the new set of rules.

In addition to polling the event, a thread may also be run by the security engine that waits on the event. When the event is fired, the thread detects the firing so that the security engine is informed that the new rule set should be used. For example, in response to the thread detecting that the event has fired, the pointer in the security engine can be changed to point to the new set of rules.

Once the event has been fired and the new set of rules is being used, the security engine can stop polling the event. Additionally, if a thread waiting on the event is run by the security engine, that thread can be terminated.

Another way in which manager 112 can instruct the security engines 118 to begin using the new set of rules is to call a function exposed by each of the security engines 118 (e.g., a "switch" function). Calling such a function of a security engine 118 instructs that security engine to begin using the new set of rules. For example, in response to such a function being invoked on a security engine 118, the security engine changes its pointer to point to the new set of rules.

Another way in which manager 112 can instruct the security engines 118 to begin using the new set of rules is to notify each of the security engines 118 of a shared data structure that each security engine 118 can access. Manager 112 can inform each security engine of the shared data structure at different times, such as by calling a function on each security engine 118 (e.g., an "identify data structure" function), or by identifying the shared data structure when the new rules are passed to the security engine 118. The shared data structure can take any of a variety of different forms, such as a location in memory (e.g., in random access memory (RAM) or a non-volatile memory such as Flash memory), a file stored on a local or remote storage device, and so forth.

Each security engine checks this shared data structure (e.g., each time the rules are accessed (during its normal operation of protecting device 104)) to determine its value. Manager 112 can instruct each of the security engines 118 to begin using the new rule set by changing the value(s) stored in the shared data structure. For example, the shared data structure may initially store a value of "previous" or a value of 0 to indicate that the current set of rules are to be used, and when it is time to switch to begin using the new rule set manager 112 can write a value of "new" or "switch" or a value of 1 to the shared data structure to indicate that the new set of rules are to be used.

As discussed above, dynamic rules data store 116 stores the data associated with the various rules being enforced by security engines 118. As such, when device 104 is being updated to begin enforcing a new policy, the data used by the security engine 118 may also change. This data can also change during the operation of device 104 (e.g., a security engine 118 may later request data from or store data in dynamic rules data 116 store). In order for the proper data to be made available to the security engines 118, when updating the security policy dynamic rules data store 116 may operate in the same manner as a security engine 118. That is, two sets of rules data would be maintained—the first set would be used prior to the switch and the second set would be used after the switch. The new data would be stored in data store 116, and data store 116 would return an indication to manager 112 when it is ready to begin using the new set of data. Data store 116 then continues to use the previous set of data until receiving an instruction from manager 112 to begin using the new set of data.

It should be noted that the various components in device 104 illustrated in FIG. 1 can be implemented within the same application process executing on device 104. For example, policy reader 110, manager 112, dynamic rules data 116, rule set generator 114, and security engines 118 may all be part of the same application process.

Alternatively, different components in device 104 illustrated in FIG. 1 can be implemented across two or more application processes executing on device 104. For example, one or more security engines 118 may run in a process that is separate from the other security engines 118 as well as separate from policy reader 110, manager 112, dynamic rules data 116, and rule set generator 114. Allowing different components to run in different application processes allows, for example, different developers to design different plug-in components (e.g., different plug-in security engines) to enhance the security of device 104. These additional plug-in components would be upgraded to enforce new policies in the same manner as other non-plug-in components.

When separating the components across multiple application processes, a mechanism is used to allow the various components to communicate with one another. This communication allows, for example, sets of new rules and data to be passed to security engines in different processes, data to be passed from security engines in different processes to dynamic rules data 116, instructions to begin using the new sets of rules to be passed to security engines in different processes, and so forth. By way of example, the components of FIG. 1 may be implemented as Component Object Model (COM) components. Additional information regarding the Component Object Model architecture is available from Microsoft Corporation of Redmond, Wash.

It should be noted that in the discussions herein, each security engine is instructed to begin using its new set of rules by manager 112. Alternatively, this instruction may be implemented in other manners that still allow each security engine to begin using its new set of rules substantially concurrently. For example, rather than using manager 112, a control mechanism to instruct each security engine to begin using its new set of rules may be distributed across the various security engines 118. This could be accomplished, for example, by each of the security engines notifying each other security engine that it is ready to begin using the new set of rules, with none of the security engines beginning to use its new set of rules until all of the security engines have notified all of the other security engines that they are ready to begin using the new set of rules.

Figure 2:
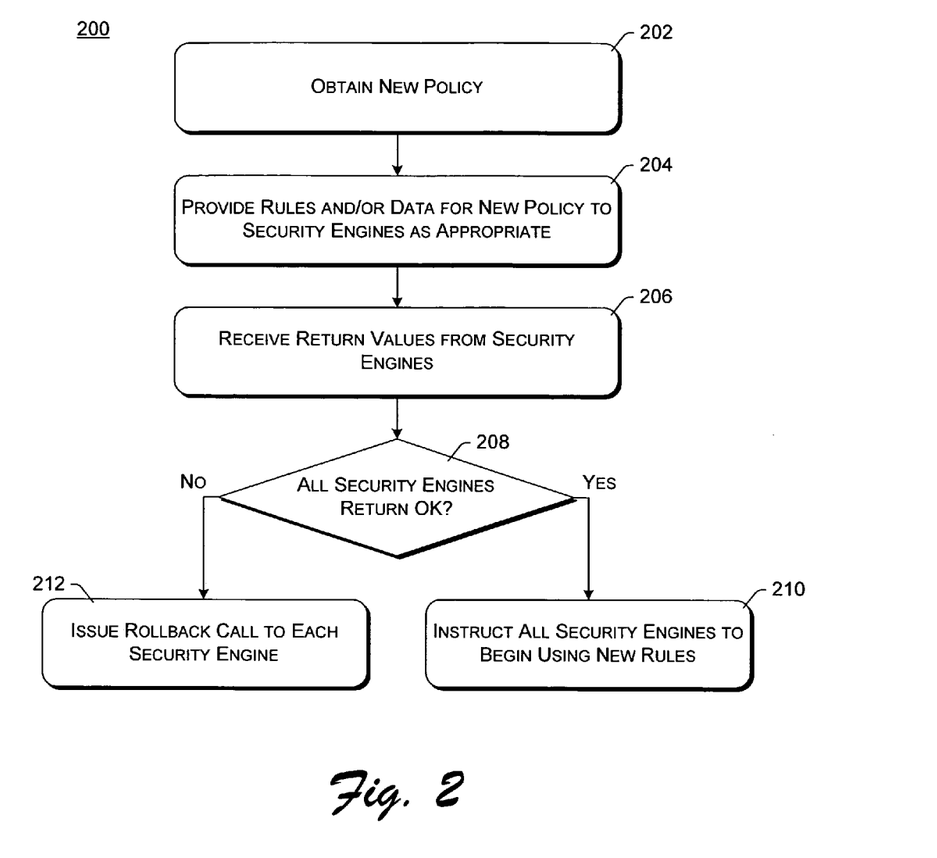
FIG. 2 is a flowchart illustrating an example process for updating a security policy.

FIG. 2 is a flowchart illustrating an example process 200 for updating a security policy. Process 200 is implemented by a component(s) that is coordinating the updating of the security policy on a device, such as manager 112 of device 104 of FIG. 1. Process 200 may be performed in software, hardware, firmware, or combinations thereof Initially, a new policy to be enforced on the device is obtained (act 202). The policy may be obtained in a "pull" manner, where device 104 initiates the access to the source of the new policy to check whether a new policy is available from the source. The policy may alternatively be obtained in a "push" manner, where device 104 is informed of (e.g., sent a message or other indication of) the availability of a new security policy or of the new security policy itself.

Regardless of how the new policy is obtained, once the new policy is obtained a new set of rules and/or data associated with the rules for the new policy is provided to each of the security devices (act 204). As discussed above, different sets of rules and/or data can be generated based on the new policy for each security engine.

Return values are then received from the security engines (act 206). In certain implementations, each security engine returns, to the component implementing process 200, a value signifying "OK" or a value signifying "Fail". When a security engine returns a value signifying "OK" it indicates that the security engine has processed the set of rules and/or data that it received and is ready to begin using the new set of rules and/or data. For example, all that remains is for the security engine to change its pointer to point to the new set of rules rather than the previous set of rules. However, when a security engine returns a value signifying "Fail", it indicates that the security engine could not (or did not) process the set of rules and/or data and that the security engine is not able to begin using the new set of rules and/or data. Additionally, as discussed above a time limit (also referred to as a timeout value or a threshold amount of time) may be imposed on responses from security engines—if a security engine does not respond with a value signifying "OK" or "Fail" within this time limit the component implementing process 200 treats the security engine as if it had returned a value signifying "Fail".

It is to be appreciated that the sending of rules and the receiving of responses (acts 204 and 206) is an asynchronous process. Different security engines may take different amounts of time to process the rules and/or data they receive, and process 200 simply waits until all of the security engines have finished their respective processing (up to any optional time limit that is imposed).

Process 200 proceeds based on whether all of the security engines have returned a value signifying "OK" (act 208). If all of the security engines have returned a value signifying "OK", then all of the security engines are ready to begin using the new set of rules, so all of the security engines are instructed to begin using the new set of rules (act 210).

However, if at least one of the security engines does not return a value signifying "OK", then a rollback call is issued to each security engine (act 212). This rollback call essentially aborts the update process, so none of the security engines will begin to use the new set of rules yet (even those security engines that had returned a value signifying "OK").

Figure 3:
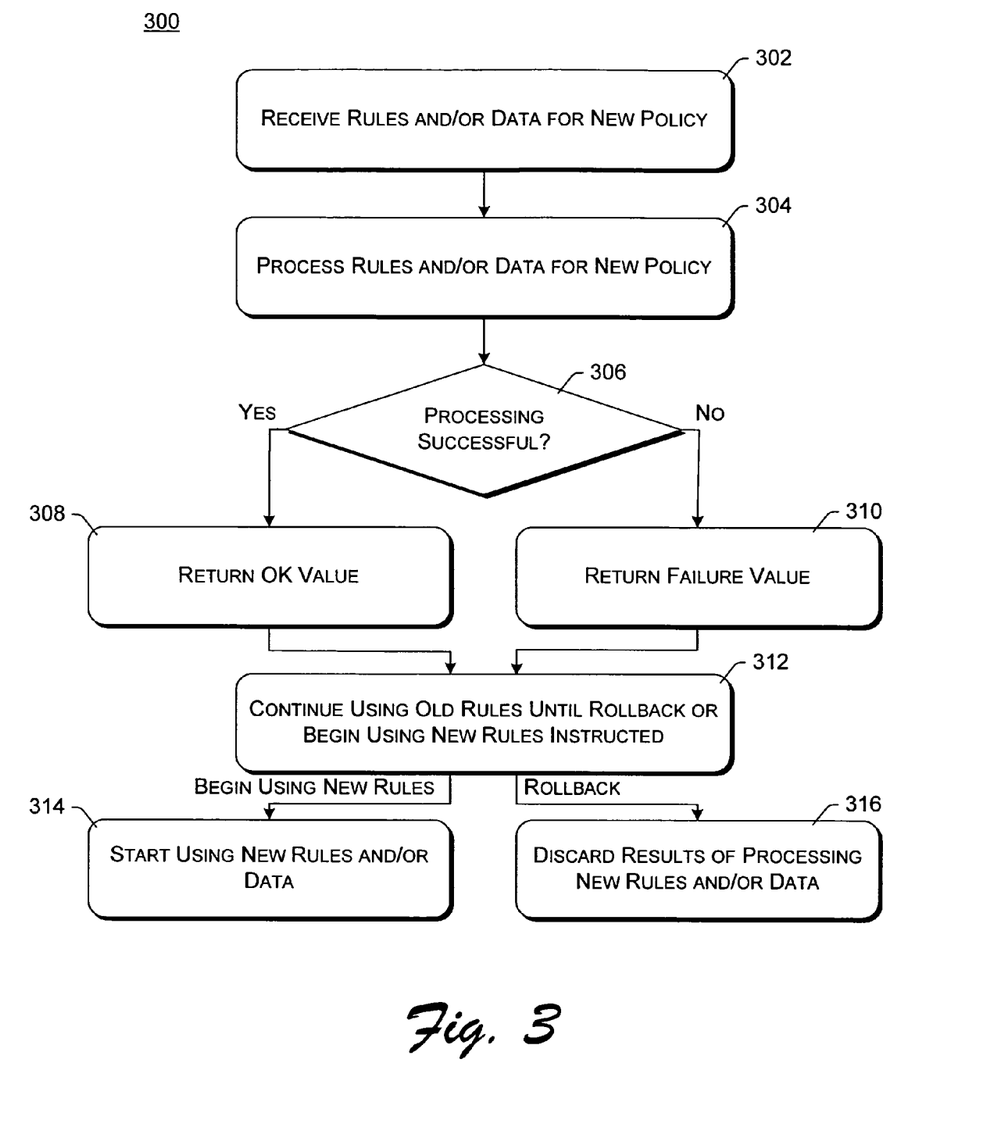
FIG. 3 is a flowchart illustrating another example process for updating a security policy.

FIG. 3 is a flowchart illustrating another example process 300 for updating a security policy. Process 300 is implemented by a security engine on a device, such as a security engine 118 on device 104 of FIG. 1. Process 300 may be performed in software, hardware, firmware, or combinations thereof.

Initially, a new set of rules and/or data are received for the new policy to be enforced (act 302). As discussed above, the rules and data may be received at substantially the same time, or alternatively the security engine may obtain data from a data store (e.g., data store 116 of FIG. 1) as needed. The new rules and/or data are then processed (act 304). Processing of the new rules and/or data creates an internal set of rules for the security engine to follow (e.g., in an internal format of the security engine) in enforcing the new security policy.

Process 300 proceeds based on whether the processing of the rules was successful (act 306). If the security engine has finished processing the set of rules and/or data that it received and is ready to begin using the new set of rules and/or data (e.g., all that remains is for the security engine to change its pointer to point to the new set of rules rather than the previous set of rules), then the processing was successful. Otherwise, the processing was not successful. If the processing was successful than a value signifying "OK" is returned (act 308). However, if the processing was not successful then a value signifying "Fail" is returned (act 310). The return values in acts 308 and 310 are returned to a component(s) that is coordinating the updating of the security policy on the device (e.g., manager 112 of FIG. 1).

Regardless of the value returned, the security engine continues to use the previous or old set of rules until instructed to rollback or begin using new rules (act 312). If instructed to begin using the new rules, then the security engine begins using the new rules and/or data (act 314), such as by changing a pointer from its previous set of rules to its new set of rules. The instruction to begin using the new rules can be received by the security engine in any of a variety of manners, as discussed above.

However, if instructed to rollback, then the security engine discards any results of processing the new rules and/or data (act 316). This discarding can be performed regardless of whether the security engine has finished processing the new set of rules it received.

Thus, as can be seen in FIG. 3, the security engine continues to use its previous set of rules until an indication to switch to the new rules is received. By the time such an indication is received, the security engine is ready to begin using the new rules, and very little time is required for the switch to occur. For example, the security engine may simply need to switch a pointer to point to its new set of rules rather than its previous set of rules.

Figure 4:
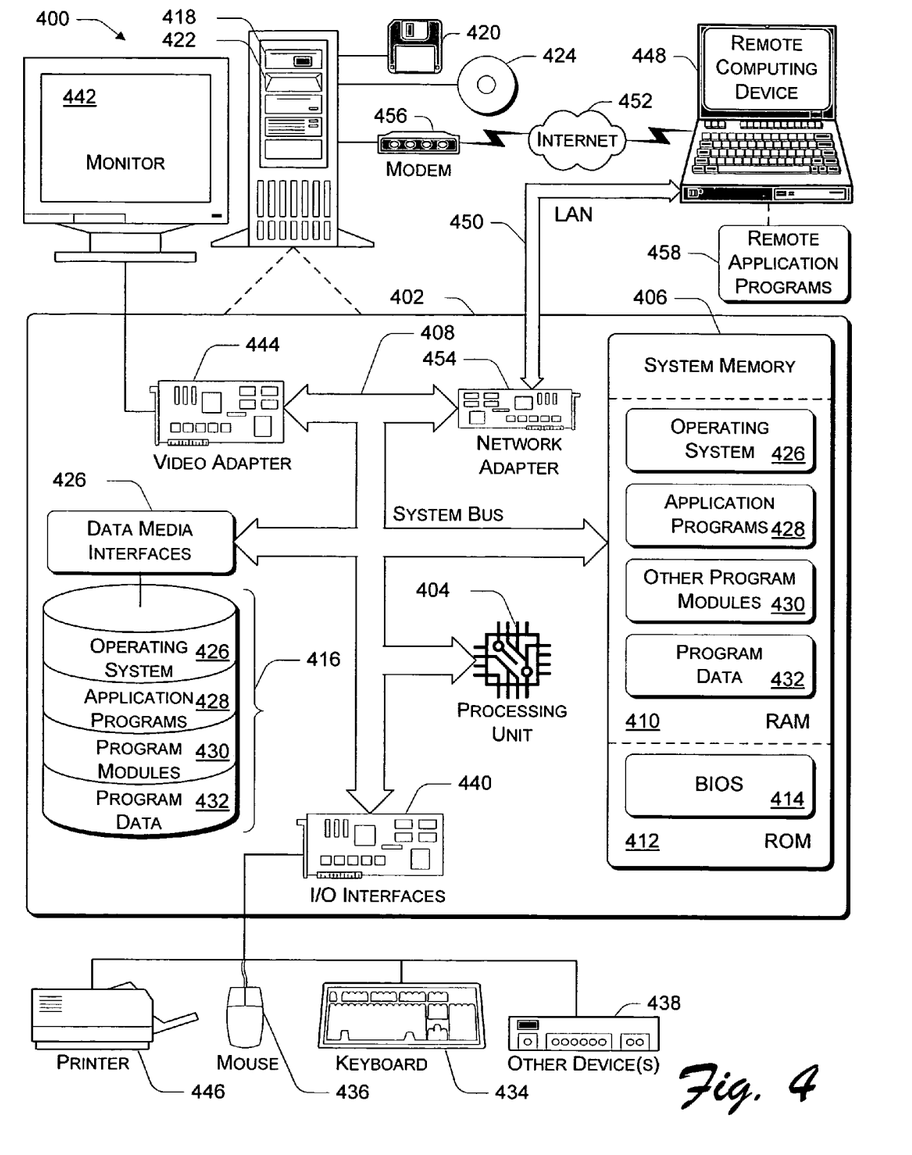
FIG. 4 illustrates an example of a general computer environment.

FIG. 4 illustrates an example of a general computer environment 400, which can be used to implement the techniques described herein. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the example computer environment 400.

Computer environment 400 includes a general-purpose computing device in the form of a computer 402. Computer 402 can be, for example, a source 102 or a device 104 of FIG. 1. The components of computer 402 can include, but are not limited to, one or more processors or processing units 404, a system memory 406, and a system bus 408 that couples various system components including the processor 404 to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are examples and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

One or more flowcharts are described herein and illustrated in the accompanying Figures. The ordering of acts in these flowchart(s) are examples only—these orderings can be changed so that the acts are performed in different orders and/or concurrently.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method, implemented in a computing device, the method comprising:
   accessing a new security policy to be implemented by a plurality of security engines of the computing device and to be implemented by the plurality of security engines in place of a current security policy, the plurality of security engines including security engines of at least a first type of security engine and a second type of security engine, the new security policy including a first set of rules specific to the first type of security engine and a second set of rules specific to the second type of security engine;
   identifying, by a rule set generator of the computing device, which set of rules is used by which type of security engine;
   processing, via each of the plurality of security engines, the identified set of rules specific to its type to establish new rules for operation of the security engine while the security engine continues to operate according to previous rules;
   returning, via each of the plurality of security engines, a fail value when it determines that it has not successfully processed the identified set of rules;
   returning, via each of the plurality of security engines, a pass value when it determines that it has successfully processed the identified set of rules;
   receiving an indication to ignore the new set of rules and continue operating each of the plurality of security engines according to the previous rules when at least one of the plurality of security engines has returned a fail value; and
   switching, after receiving a pass value from each of the plurality of security engines, each of the plurality of security engines to the new rules substantially concurrently.

2. A method as recited in claim 1, wherein switching each of the plurality of security engines to the new rules substantially concurrently comprises switching each of the plurality of security engines after each of the plurality of security engines can nearly ensure that it can begin using the new rules as soon as it receives the indication to switch to the new security policy.

3. A method as recited in claim 1, wherein the switching comprises calling, for each of the plurality of security engines, a function exposed by the security engine.

4. A method as recited in claim 1, wherein the switching comprises writing a value to a shared data structure.

5. A method as recited in claim 1, wherein the switching comprises firing an event across all of the security engines at once.

6. A method as recited in claim 1, wherein the plurality of security engines includes an antivirus engine.

7. A method as recited in claim 1, wherein the plurality of security engines includes a firewall engine.

8. A method as recited in claim 1, wherein the plurality of security engines includes an intrusion detection engine.

9. A method as recited in claim 1, wherein the plurality of security engines includes a vulnerability analysis engine.

10. A method as recited in claim 1, wherein the plurality of security engines includes a behavioral blocking engine.

11. A method as recited in claim 1, wherein each of the plurality of security engines is part of a same application process.

12. A method as recited in claim 1, wherein the plurality of security engines includes one or more of: an antivirus engine, a firewall engine, an intrusion detection engine, a vulnerability analysis engine, and a behavioral blocking engine.

13. A method as recited in claim 12, wherein the switching comprises one or more of:
   calling, for each of the plurality of security engines, a function exposed by the security engine;
   writing a value to a shared data structure; and
   firing an event across all of the security engines at once.

14. One or more computer readable storage media storing one or more instructions that, when executed by one or more processors, causes the one or more processors to:
   receive information of a new security policy to be used by a plurality of security engines, the plurality of security engines including security engines of at least a first type of security engine and a second type of security engine, the new security policy including a first set of rules specific to the first type of security engine and a second set of rules specific to the second type of security engine;
   identify, by a rule set generator, which set of rules is used by which type of security engines;
   process, via each of the plurality of security engines, the identified set of rules specific to its type to generate new rules having associated data for operation of the security engine;
   use a previous set of rules and associated data when each of the plurality of security engines determines that it has not successfully processed the identified set of rules; and
   use, upon receiving an indication that each of the plurality of security engines determines that it has successfully processed the identified set of rules, the new set of rules and associated data on each of the plurality of security engines substantially concurrently.

15. One or more computer readable storage media as recited in claim 14, wherein the identify which set of rules is used by which type of security engines includes inferring which set of rules are associated with which type of security engine.

16. One or more computer readable storage media as recited in claim 14, wherein the identify which set of rules is used by which type of security engines comprises using an identifier associated with each set of rules to identify which set of rules is used by which type of security engines.

17. One or more computer readable storage media as recited in claim 14, wherein the indication that each of the plurality of security engines has successfully processed the identified set of rules comprises calling a function to begin using the new set of rules.

18. One or more computer readable media as recited in claim 14, wherein the indication comprises identifying, in a shared data structure, a value indicating to begin using the new set of rules and associated data.

19. One or more computer readable media as recited in claim 14, wherein the instructions further cause the one or more processors to begin polling an event, and wherein the indication comprises detecting that the event has been fired.

20. One or more computer readable storage media as recited in claim 14, wherein the one or more instructions comprises one of: an antivirus service provider, a firewall service provider, an intrusion detection service provider, a vulnerability analysis service provider, and a behavioral blocking service provider.

21. One or more computer readable storage media as recited in claim 20, wherein the indication that each of the plurality of security engines has successfully processed the identified set of rules comprises one or more of:
   having a function exposed by the one or more instructions invoked;
   identifying, in a shared data structure, a value indicating to begin using the new set of rules and associated data; and
   detecting that an event being polled has been fired.

22. A method, implemented in a computing device, the method comprising:
   receiving a new security policy to be enforced by a plurality of security engines of the computing device, the plurality of security engines including security engines of at least a first type of security engine and a second type of security engine, the new security policy including a first set of rules specific to the first type of security engine and a second set of rules specific to the second type of security engine;
   identifying, by a rule set generator of the computing device, which set of rules is used by which type of security engines;
   processing, via each of the plurality of security engines, the identified set of rules specific to its type to establish new rules for operation of the security engine while the security engine continues to operate according to previous rules; and
   enforcing, in response to receipt of an indication that each of the plurality of security engines has determined that it has successfully processed the identified set of rules, the new rules on each of the plurality of security engines substantially concurrently.

23. A method as recited in claim 22, wherein the indication comprises calling a function to begin using the new set of rules.

24. A method as recited in claim 22, wherein the indication comprises identifying, in a shared data structure, a value indicating to begin using the new set of rules.

25. A method as recited in claim 22, wherein the indication comprises detecting that an event being polled has been fired.

26. A method as recited in claim 22, wherein the security engines includes one or more of: an antivirus engine, a firewall engine, an intrusion detection engine, a vulnerability analysis engine, and a behavioral blocking engine.

27. A method as recited in claim 26, wherein the indication comprises one or more of:
   having a function exposed by the security engine invoked;
   identifying, in a shared data structure, a value indicating to begin using the new set of rules and associated data; and
   detecting that an event being polled has been fired.

28. A method as recited in claim 22, further comprising:
   returning, via each of the plurality of security engines, a fail value when it determines that it has not successfully processed the identified set of rules; and
   returning, via each of the plurality of security engines, a pass value when it determines that it has successfully processed the identified set of rules.

* * * * *